(12) United States Patent
Johnston et al.

(10) Patent No.: US 7,368,167 B2
(45) Date of Patent: May 6, 2008

(54) ULTRA LOW DENSITY THERMALLY CLAD MICROSPHERES AND METHOD OF MAKING SAME

(75) Inventors: Richard W Johnston, Ft. Erie (CA); Richard F. Clark, Eden, NY (US)

(73) Assignee: Henkel Corporation, Gulph Mills, PA (US)

(*) Notice: Subject to any disclaimer, the term of this patent is extended or adjusted under 35 U.S.C. 154(b) by 0 days.

(21) Appl. No.: 10/870,097

(22) Filed: Jun. 17, 2004

(65) Prior Publication Data

US 2005/0282014 A1 Dec. 22, 2005

(51) Int. Cl.
*B32B 5/16* (2006.01)

(52) U.S. Cl. ............... 428/403; 428/404; 428/407

(58) Field of Classification Search ........... 428/402, 428/403, 404, 407
See application file for complete search history.

(56) References Cited

U.S. PATENT DOCUMENTS

| | | | |
|---|---|---|---|
| 3,615,972 A | 10/1971 | Morehouse, Jr. et al. | |
| 3,808,701 A | 5/1974 | Bachmann | |
| 4,397,799 A | 8/1983 | Edgren et al. | |
| 4,582,756 A | 4/1986 | Niinuma et al. | |
| 4,722,943 A | 2/1988 | Melber et al. | |
| 4,829,094 A | 5/1989 | Melber et al. | |
| 5,180,752 A * | 1/1993 | Melber et al. | 521/57 |
| 5,205,290 A | 4/1993 | Unger | |
| 5,246,780 A | 9/1993 | Farer et al. | |
| 5,342,689 A * | 8/1994 | Melber et al. | 428/402.22 |
| 5,536,756 A | 7/1996 | Kida et al. | |
| 5,547,656 A | 8/1996 | Unger | |
| 5,559,202 A | 9/1996 | Yoshikawa | |
| 5,580,656 A * | 12/1996 | Melber | 428/403 |
| 5,658,969 A * | 8/1997 | Gerace | 523/218 |
| 5,861,214 A | 1/1999 | Kitano et al. | |
| 6,106,946 A | 8/2000 | Tanaka et al. | |
| 6,225,361 B1 | 5/2001 | Nakajima | |
| 6,235,394 B1 | 5/2001 | Shimazawa et al. | |
| 6,235,800 B1 | 5/2001 | Kyuno et al. | |
| 6,365,641 B1 | 4/2002 | Masuda et al. | |
| 6,387,497 B1 | 5/2002 | Nishida et al. | |
| 6,455,599 B1 | 9/2002 | Berghmans et al. | |
| 6,538,042 B1 | 3/2003 | Berghmans et al. | |
| 2005/0164000 A1 | 7/2005 | Okuyame et al. | |

FOREIGN PATENT DOCUMENTS

| | | |
|---|---|---|
| EP | 1 206 964 A1 | 5/2002 |
| JP | 2005-139350 | 6/2005 |
| KR | 2005019147 | 3/2005 |

\* cited by examiner

*Primary Examiner*—H. Thi Le
(74) *Attorney, Agent, or Firm*—Roetzel & Andress; George W. Moxon, II

(57) ABSTRACT

Microsphere beads are mixed with a surface barrier solid, liquid or mixture of such a liquid with a solid effective to prevent agglomeration and surface bonding of the microspheres; by the control of the application of heat and balancing temperature and active mixing, removal of water from and expansion of the microsphere is achieved. Microsphere densities of as low as 0.005 to less than 0.015 g/cm$^3$ are realized. The surface barrier solid, liquid or mixture of such a liquid with a solid in the present invention is any one of a wide diversity of materials which meet the requirements of the intended function, i.e., to prevent the agglomeration of the microspheres during the process. Suitable materials include, by way of example, fillers, pigments, plasticizers, diluents, extenders, monomers and oligomers and the like.

11 Claims, No Drawings

ULTRA LOW DENSITY THERMALLY CLAD MICROSPHERES AND METHOD OF MAKING SAME

BACKGROUND OF THE INVENTION

The present invention relates to low density expanded thermally clad thermoplastic microspheres, preferably microspheres having a density of less than 0.015 g/cm³ and a process for making the same. The thermal cladding is a barrier coat which can be applied as a liquid, solid, or combination of liquids and solids.

Microspheres are heat expandable thermoplastic polymeric hollow spheres containing a thermally activatable expanding agent, such as those disclosed in U.S. Pat. No. 3,615,972, issued to Donald S. Morehouse. In the Morehouse patent, the microspheres are made in an aqueous system by the limited coalescence process under pressure, and the resulting product is a "wet-cake" of the unexpanded microsphere beads wetting agents and water. The wet-cake is typically about 40 to 75 weight percent solids, and because of the wetting agents employed in the formation of the beads, the surface will be wet. Many important uses of the microspheres require the removal of the water. Other teachings concerning such materials and uses are found in, for example, U.S. Pat. Nos. 3,864,181, 4,006,273, and 4,044,176.

It is common to expand the beads before use, such as, for example, in the production of syntactic foams in a wide variety of polymer matrices. In unexpanded form, the dry microsphere beads typically have a displacement density of about 1.1 g/cm³. Dry, expanded microspheres typically have a density by displacement generally in the range 0.06 g/cm³ to 0.02 g/cm³, and, preferably, are free-flowing. In the blending of these materials into a polymer binder system as a constituent in syntactic foam formulations, the exceptional ultra low density characteristic has led to drastic changes in the ways in which the weight and volume relationships of such materials are considered. As a general rule of thumb, the addition of one percent by weight of the expanded microspheres will represent the substitution of about twenty percent or more by volume of the host polymer in typical systems.

The characteristics of the microspheres have precluded many approaches to their drying and expansion. Severe agglomeration and adherence of the materials to warm surfaces of equipment have eliminated most approaches to such procedure from serious consideration. Wet expansion in steam is of limited use when an aqueous system is not wanted, and the spray drying procedure is so expensive and the product so prone to excessive, and extremely difficult dusting problems, along with substantial agglomeration and limited expansion of the beads.

The techniques in the prior art for the production of expanded microspheres produced from wet-cake are limited in at least one of two aspects: either the product remains wet, or the expanded beads are produced in dry form with substantial amounts of agglomeration and a limited degree of expansion; The "acceptable" levels of agglomeration achieved in such procedures are in the range of about 3 to 10% of the product.

Pre-expanded, dry, low density microspheres can produced by spray drying, as is taught by U.S. Pat. No. 4,397,799, but the spray drying procedure has several disadvantages, such as a dedicated spray drying facility is required, representing a very substantial capital investment, and very considerable operating expenses, particularly for skilled labor and utilities costs in heating the drying fluid, and the product is produced entrained in a heated, moving fluid stream, and the requirements of collection, recovery and handling are considerable. Experience has shown that the spray drying technique is suited for developing expanded densities no less than about 0.032 to about 0.040 g/cm³ and typically about 0.036 g/cm³. Attempts at lower densities result in unacceptable levels of agglomeration, greater than about 10% of the product, and equally unacceptable product losses attributable to over-expansion, with attendant disruption of the bead structure.

An acceptable process of making microspheres is disclosed in U.S. Pat. No. 4,722,943, the disclosure of which is incorporated by reference herein, which discloses a process wherein wet-cake mixed with a processing aid, dried and expanded in an integral operation. In the process, a processing aid is adhered to and embedded in the surface of the microspheres by thermal bonding, wherein the surface of the microspheres is heated to a temperature above the glass transition temperature, Tg, so that the polymer material behaved as a hot melt adhesive to bind the processing aid. The product is within the limits heretofore considered "acceptable", with agglomeration levels in the range of 3 to 10%.

In U.S. Pat. No. 5,180,752, the disclosure of which is incorporated by reference herein, a technique for drying and expanding thermoplastic microspheres is disclosed, but that the teaching considers the expansion to be at the limit of expandability at a density of 0.015 g/cm³.

U.S. Pat. No. 5,580,656, the disclosure of which is incorporated by reference herein, relates to a further development in the drying and expansion operation, wherein the surface barrier coating is, in whole or in material part, a liquid material at drying temperatures. This disclosure also considers a density of 0.015 g/cm³ to be a lower limit on density.

It has been thought for some time in the art that the limits of expansion of thermoplastic microspheres had been reached at densities of about 0.015 g/cm³. Since the uses of such materials is most often directed to incorporation into formulations for the purpose of displacing mass, the lower the density of the microspheres, the more desirable and cost effective their use becomes. It has been common for those in the art to theorize that expansion of microspheres to lower densities was not possible because the wall thickness of the microspheres would be so reduced that the spherical hollow structure of the microsphere beads would shrink and "implode" as the blowing agent within the cellular structure cooled after expansion, or that the walls would be disrupted and break as such distention required for lower densities. Those of ordinary skill in the art have not made hollow thermoplastic microspheres at densities of less than 0.015 g/cm³, and have not supposed that such a feat is possible.

SUMMARY OF THE INVENTION

The present invention is the result of the discovery that it is possible to achieve thermoplastic microspheres having densities significantly lower than those known in the prior art, having expanded densities of from less than 0.015 g/cm³, such as less than 0.0145 g/cm³ to as low as about 0.005 g/cm³. The lower density microspheres which are produced are thermally clad so that the resulting microspheres are acceptably free flowing.

The present invention has, in fact, reached the point where the range of densities or specific gravities of the microspheres were believed limited by the reduced wall thickness of the expanded beads, since the expanded microspheres must still retain a vapor barrier to the blowing agent within the interior of the hollow microsphere structure and have the physical integrity and strength to retain their hollow, spherical form and to have the strength and integrity to withstand the stresses of normal usage The wall thickness attained in the present invention are from as low as about 0.01 μm, ranging up to about 0.10 μm.

In the present invention, the polymer material still functions as a vapor barrier to the blowing agent at the temperatures and pressure differentials of expansion, and the thermoplastic microspheres are preferably those containing a substantial proportion of acrylic monomers. Such polymers have Tg values of about 50° C. and higher, with the preferred polymers being those from acrylic monomer, or where the majority of the monomers is acrylic monomer, such as, acrylonitrile.

It is an object of the present invention to provide, in part, a process for continuously drying, i.e., removal of water from thermoplastic microsphere wet-cake.

A further object of the present invention is to provide a process for expanding microspheres to expanded densities lower, and expanded microsphere wall thicknesses thinner, than those heretofore attained in the art.

It is another object of the present invention to provide a process for producing microsphere beads substantially free of agglomerates and water.

A still further object is to produce a ultra low density microsphere with a solid or liquid thermal cladding resulting in a composite density of 0.06 $g/cm^3$ to 0.005 $g/cm^3$.

DETAILED DESCRIPTION OF THE INVENTION

As is noted, the present invention is the result of the discovery that it is possible to achieve thermoplastic microspheres having densities significantly lower than those known in the prior art, having expanded densities of from less than 0.015 $g/cm^3$, such as less than 0.0145 $g/cm^3$ to as low as about 0.005 $g/cm^3$. The lower density microspheres which are produced are thermally clad so that the resulting microspheres are acceptably free flowing.

With the present invention, larger microspheres, having expanded diameters on the order of 100 to 300 μm, can have lower densities, on the order of less than 0.015 $g/cm^3$ to as low as about 0.005 $g/cm^3$. Smaller microspheres do not have adequate polymer mass to maintain the required minimum wall thickness at the extreme low densities, and are thus, in some cases, limited to somewhat higher densities within the defined range, but still are far lower than has heretofore been attained for such small microspheres. Thus, for microspheres having an unexpanded diameter of from about 10 to 100 μm, we are able to attain expanded densities of as low as about 0.005 $g/cm^3$.

It is surprising that such low densities can be produced at all, and that such wall thicknesses can provide useful expanded microsphere products. The additional surprise is that the expanded microspheres of the present invention, while not as strong and durable as prior art microspheres at higher densities, are quite good performers in most applications and are not so fragile as those of ordinary skill in the art would expect. The reason for such strength and durability is not fully understood.

It has been hypothesized, although we have no wish to be bound thereby, that as the expanded microspheres are cooled to ambient and the blowing agent tends to liquefy, the resulting pressure below ambient pressure creates a differential sufficient to cause diffusion of atmospheric gases, particularly nitrogen from the atmosphere, into the interior of the hollow structure to equalize the interior pressure with ambient pressure. As the interior pressure within the expanded microspheres equilibrates with ambient pressure, the physical properties of the polymer walls is adequate to support the hollow microsphere structure.

In the present invention, microspheres are dried and expanded with an adherent coating of a surface barrier solid, liquid or mixture of such a liquid with a solid by a procedure which results in the attainment of low microsphere density, as low as less than 0.015, and down to 0.005 $g/cm^3$, and a composite density of 0.06 to 0.005 $g/cm^3$.

The procedure of the present invention is based on sequential or concurrent steps of first mixing of dry microspheres and the surface barrier solid, liquid or mixture of such a liquid with a solid and then drying the microspheres to remove water and leaving the surface barrier solid, liquid or mixture of such a liquid with a solid to coat the surface thereof. Subsequent or concurrent expansion of the microsphere is facilitated. Alternatively, microsphere wet-cake is independently dried and then mixed with a surface barrier solid, liquid mixture of such liquid. Subsequent or concurrent expansion of the microsphere is facilitated.

Microspheres are generally available in the form of a wet-cake, which is typically about 40 percent water, about 60 percent unexpanded microsphere beads, and minor additional amounts of the materials employed in the manufacture of the beads, such as, "wetting agents." Microspheres for use in the present invention are those available from Sovereign Specialty Chemicals, 710 Ohio Street, P.O. Box 1092, Buffalo, N.Y. 14240-1092, which are polyvinylidene chloride-acrylonitrile copolymer or polyacrylonitrile homopolymer microspheres with an inclusion of iso-butane as the blowing agent. The available materials are preferred in the present invention, primarily for their availability and reasonable cost. The copolymers generally have high Tg and expansion temperatures compared to polyvinylidene chloride homopolymer microspheres.

Microspheres can be made from a rather wide diversity of thermoplastic polymers. In practice, the commercially available microspheres are generally limited to polyvinylidene chloride homopolymer or a random copolymer of vinylidene chloride and acrylonitrile, or a random terpolymer of polyvinylidene chloride, acrylonitrile, and divinyl benzene. Microspheres of other materials, such as polyacrylonitrile, polyalkyl methacrylates, polystyrene, or vinyl chloride, are known, but these materials are not widely and generally available. The present invention is not applicable to any thermoplastic of which microspheres is made. In particular, the present invention is not applicable to polyvinylidene chloride homopolymer, polystyrene, or polyvinyl chloride.

Suitable polymers for the formation of thermoplastic microspheres for use in the present invention include materials which are effective vapor barriers to the blowing agent at expansion temperatures, and which have adequate physical properties to form self-supporting expanded microspheres with the thin wall thickness attained at the ultra low densities produced in the present invention. Such polymers have a Tg of at least 50° C.

Those polymers containing a substantial proportion of acrylic monomers can be employed whenever the polymer material still functions as a vapor barrier to a the bowing agent at the temperatures and pressure differentials of expansion. Such polymers have Tg values of about 50° C. and higher. Preferred polymers are those in which the acrylic monomer, or the majority of the acrylic monomer, is acrylonitrile. The thermoplastic polymers of interest are, for the most part, copolymers. Unless otherwise specified, the term copolymer is used herein in an inclusive sense to connote polymers formed by the polymerization of two or more monomers, and encompasses terpolymers, tetrapolymers, and the like.

Acrylic monomers useful in forming the thermoplastic polymers in the manufacture of microspheres useful in the present invention include acrylonitrile, alkyl acrylates and alkyl methacrylates, including methyl methacrylate, methyl acrylate, butyl acrylate, butyl methacrylate, isobutyl methacrylate, stearyl methacrylate, and other related acrylic monomers such as 1,3-butylene dimethacrylate, allyl methacrylate, trimethylolpropane, trimethacrylate, trimethylolpropane triacrylate, 1,4-butanediol dimethacrylate, 1,3-butanediol dimethacrylate, isobornyl methacrylate, dimethylaminoethyl methacrylate, hydroxyethyl methacrylate, hydroxypropyl methacrylate, diurethane dimethacrylate, and ethylene glycol dimethacrylate. Other, non-acrylic monomers may be included in copolymers, styrene, di-vinyl benzene, vinylidene chloride and the like, typically in minor proportions in the polymer.

A preferred thermoplastic is a terpolymer of acrylonitrile, vinylidene chloride and a minor proportion, normally less than 5% by weight of divinyl benzene. Microsphere of the preferred terpolymer are commercially available from Sovereign Specialty Chemicals.

A wide variety of blowing agents can be employed in microspheres. Again, the commercially available materials are more limited in range, most often being selected from the lower alkanes, particularly propane, butane, pentane, and mixtures thereof, suited to the acrylonitrile—polyvinylidene chloride copolymer. As the Morehouse patent clearly sets forth, the selection of the blowing agent is a function of the particular thermoplastic polymer employed, and in the context of the present discussion, those ordinarily used with the commercially available microspheres are given the greatest attention. Isobutene is most often used with polyvinylidene chloride-acrylonitrile copolymer microspheres.

In unexpanded form, the microspheres can be made in a variety of sizes, those readily available in commerce being most often on the order of 2 to 100 micrometers, particularly 10 to 30 micrometers. When expanded, these materials will have bead diameters on the order of about 10 to 300 micrometers, most commonly about 50 to 250 micrometers, and most often about 100 to 200 micrometers. It is possible to make microspheres in a wider range of sizes, and the present invention is applicable to them as well. It has been demonstrated, for example, that microspheres can be made from as small as about 0.1 micrometer, up to as large as about 1 millimeter, in diameter, before expansion. Such materials are not generally available.

While variations in shape are possible, the available microspheres are characteristically spherical, with the central cavity containing the blowing agent being generally centrally located. Dry, unexpanded microspheres typically have a displacement density of just greater than 1 $g/cm^3$, typically about 1.1.

When such microspheres are expanded, they are typically enlarged in diameter by a factor of 7 to 15, and even 20 times the diameter of the unexpanded beads, giving rise to a displacement expanded density, when dry, as low as less than 0.015 $g/cm^3$, preferably less than 0.0145 $g/cm^3$, and down to 0.005 $g/cm^3$.

The selection of a suitable surface barrier or surface barriers among the wide diversity of materials that meet the general characteristics required of such materials is generally a matter of balancing a number of functional requirements in the procedure of the invention and in the context of the intended uses of the product. Among the criteria that will guide those of ordinary skill in the art are the function of the barrier, the end use of the barrier, dusting issues, and the like.

The primary function of the surface barrier solid, liquid or mixture of such a liquid with a solid is to prevent the microspheres from coming into direct contact with one another and with the surfaces of the processing equipment during expansion and thus to prevent them adhering. The barrier coating material wets the surface of the microspheres, and forms a barrier between the thermoplastic material and any other materials with which it might otherwise come into contact.

When the present invention is being conducted for a particular known end use, it is ordinarily possible to tailor the selection of the surface barrier solid, liquid or mixture of such a liquid with a solid to the requirements of use. It is generally desirable to consider the surface barrier solid, liquid or mixture of such a liquid with a solid as a unit for unit replacement for the same material in the intended use. As those of ordinary skill in the art will readily recognize, the fact that the surface barrier solid, liquid or mixture of such a liquid with a solid will adhere to the surface of the microspheres may be a factor that will require adjustment of proportions, but such requirements will not ordinarily be substantial or critical.

When combinations of different materials are employed as the surface barrier solid, liquid or mixture of such a liquid with a solid, it is possible to stay within the compounding requirements of virtually any designed formulation.

The cohesiveness of the surface barrier solid, liquid or mixture of such a liquid with a solid, will greatly reduce the tendency of the composite product to become entrained in gas streams or in the environmental atmosphere. The tendency to dusting can be a material safety hazard, both in terms of exposure to workers and in terms of fire and explosive hazards. Since the microspheres contain an alkane blowing agent in substantial proportions, large quantities of these materials in the atmosphere presents a substantial problem in some circumstances. These difficulties, and the effort and expense of their resolution are minimized or eliminated altogether in the present invention. The increased cohesiveness of the composite also facilitates the demands on the processing equipment and system in recovering the expanded and dried microspheres, and product losses are substantially reduced.

The microspheres are homogeneously dispersed in the liquid in a composite product. In most circumstances, the dried microspheres will be in a relatively dry, free-flowing granular form in cases where the melting point of the surface barrier liquid is above ambient. When the surface barrier remains liquid at ambient temperatures, the composite product will be a coherent, flowable floc-like mass at relatively high proportions of surface barrier liquid to microspheres. At lower proportions of the surface barrier liquid, the mass will remain relatively coherent in the form of a number of loosely associated "clumps," which may be somewhat granular or powder-like in character. Such "granular flocs" permit the handling of the composite like a moist powder or granular material in solids handling and processing equipment, and still afford the compound advantages of a liquid dispersion; these forms of the composite are accordingly generally preferred for the majority of applications. In the usual proportions, as described herein, the mass of the dispersion will exhibit a viscosity dependent on the specific liquid employed. The flocculation occurs with no agglomeration of the microsphere, which remains in discrete form. If the microspheres are subsequently or concurrently expanded, all the forgoing characteristics are preserved.

Further the coherence provided by the flocculent-like action of the surface barrier liquid, even at very low proportions of the surface barrier liquid the product, leads to very low dusting. In addition, these same properties permit the drying of microsphere with very low relative proportions of the surface barrier when compared to particulate solids, and permits the effective production of the composite at lower densities than have been practical previously. In turn, syntactic foams made from the composite have the potential for lower densities as well.

While the surface barrier liquid wets the surface of the microspheres when the composite is formulated into polymer systems and the like, the liquid will often be dissolved or dispersed in the system, and the surface of the microspheres will be wet with the final formulation rather than the surface barrier liquid, so that the final formulation has a greater homogeneity. In syntactic foams, for example, compression strength, compression set, impact strength, and some or all tensile properties will be improved. When the syntactic foam product is an adhesive, adhesive bond strength may be considerably enhanced.

These characteristics will not be lost if a particulate solid is employed in conjunction with the surface barrier liquid. Unlike our prior efforts, in such cases, the solid particulate will not be bonded to the surface of the microspheres, and will become dispersed into the binder matrix during compounding. The solids to be employed are those disclosed in our prior work as cited and discussed above, and incorporated by reference herein.

The selection of the surface barrier solid, liquid, and the optional solid particulate, should be based on the end use intended for the composite, and is preferably a component desirable for inclusion in the intended formulation. The liquid is preferably a functional component of the product. The liquid material chosen may be, for example, a plasticizer, a surfactant or wetting agent which preferentially wets the surface of the microspheres, an extender or diluent, a solvent for components of the formulation, (but not for the microspheres), a reactive monomer, oligomer, prepolymer, or low molecular weight polymer, or even a polymer solution or non-aqueous dispersion. Other like materials may be employed from among the many common to the compounding of such formulations.

By the selection of non-flammable surface barrier liquids, or materials which are non-flammable under the conditions of the operating and processing characteristics of the mixture, it has become possible to employ equipment that permits effective subsequent or concurrent expansion at temperatures where the need for an inert atmosphere is eliminated without the introduction of substantial fire and explosion hazards. This represents a quite material reduction in manufacturing expense, and a real gain in system safety. The beads produced by the present invention are generally free from dusting, and do not require an inert atmosphere or other processing provisions intended to control dusting related hazards.

When necessary, of course, flammable materials may be employed as the surface barrier solid, liquid or mixture of such a liquid with a solid, if adequate safety precautions are employed, although it will generally be preferred to avoid such materials whenever possible.

The surface barrier solid, liquid or mixture of such a liquid with a solid in the present invention is any one of a wide diversity of materials which meet the requirements of the intended function. These materials are added to the wet-cake to offset the tendency of the wetting agent to bind the microspheres into agglomerates. The silica which forms as the silicic acid is dried is in addition to the added material, and is, so far as is known, incorporated as an inert constituent of the coating on the microspheres, but is not itself capable of forming the coating. It is required that the surface barrier solid, liquid or mixture of such a liquid with a solid be free flowing at the temperature and pressure of the drying operation, that it not react chemically with the microspheres, and preferably not with the other constituents of the system, e.g., the wetting agents and related components of the wet-cake and, at the temperature of the expansion, that it function to separate the microspheres undergoing expansion so that they do not come into contact and bond to one another.

The surface barrier solid, liquid or mixture of such a liquid with a solid may be selected from one or more components meeting the following general characteristics:

For Solids Barrier Coatings:
1. The barrier coating material should be a finely divided particulate or fibrous material. It may be spherical or irregular in shape, and it may be a solid or a hollow particle.
2. The barrier coating material should be a free-flowing solid under the processing conditions of the present invention. It should have a melting point, for example, above the temperature of the drying process, generally above about 250° C.
3. The barrier coating material must be finely divided enough to be able to effectively blend with and adhere to the surfaces of the microspheres. The maximum major dimension of the particle size should preferably be no larger than about the diameter of the expanded microspheres and preferably less. The minor dimensions will generally be as small as possible, commonly having a de facto lower limit of effectively about 0.01 micrometers.
4. While the barrier coating material may be either organic or inorganic, there are ordinarily considerable advantages to the employment of inorganic materials as at least a substantial component of the surface barrier coating. Such materials are commonly available in the dimensions of interest, they are common inclusions along with the microspheres in a wide diversity of syntactic foam formulations, they pose few problems in compounding and formulating end uses of the microspheres, and they are generally less expensive. It is also generally easier to assure that the barrier coating material does not itself develop undesirable characteristics in the processing, i.e., by becoming tacky itself or the like.
5. The surface barrier coatings are desirably materials which are pigments, reinforcing fillers, or reinforcing fibers in polymer formulations and thus are commonly used in the formulations where the microspheres are to be used. For example, talc, calcium carbonate, barium sulfate, alumina, such as particularly alumina tri-hydrate, silica, titanium dioxide, zinc oxide, and the like may be employed. Other materials of interest include spherical beads, or hollow beads of ceramics, quartz, glass or polytetrafluoroethylene, i.e, TEFLON®, or the like. Among the fibrous materials of interest are glass fibers, cotton flock, polyamide fibers, particularly aromatic polyamides such as Nomex® and Kevlar®, carbon and graphite fibers, metallic fibers, ceramic fibers, and the like. Conductive surface barrier coatings, such as conductive carbon, copper or steel fibers, and organic fibers with conductive coatings of copper or silver or the like are also of particular use. All these are typical and illustrative of the commonly employed materials in syntactic polymer foam compositions, and those of ordinary skill in the art will be familiar with others that can also be suitable employed.
6. The selection of suitable surface barrier coatings among the wide diversity of materials that meet the general characteristics required of such materials is generally a matter of balancing a number of functional requirements in the procedure of the invention and in the context of the intended uses of the product. Among the criteria that will guide those of ordinary skill in the art are the following:
7. The primary function of the surface barrier coating is to prevent the microspheres from coming into direct contact with one another and with the surfaces of the processing equipment during expansion and thus to prevent them adhering. The barrier coating material becomes thermally bonded to the surface of the microspheres, and forms a barrier between the thermoplastic material and any other materials with which it might otherwise come into contact.
8. When the present invention is being conducted for a particular known end use, it is ordinarily possible to tailor the selection of the surface barrier coating to the requirements of use. It is generally desirable to consider the surface barrier coating as a unit for unit replacement for the same material in the intended use. As those of ordinary skill in the art will readily recognize, the fact that the surface barrier coating will adhere to the surface of the microspheres may be a factor that will require adjustment of proportions, but such requirements will not ordinarily be substantial or critical. When combinations of different materials are employed as the surface barrier coating, it is possible to stay within the compounding requirements of virtually any designed formulation.
9. By virtue of the higher density of the surface barrier coating than that of the expanded microspheres, the composite product has a greatly reduced tendency to become entrained in gas streams or in the environmental atmosphere. As those of ordinary skill in the art will readily appreciate, the tendency to dusting is a material safety hazard, both in terms of exposure to workers and in terms of fire and explosive hazards. Since the microspheres contain an alkane blowing agent in substantial proportions, large quantities of these materials in the atmosphere presents a substantial problem in some circumstances. These difficulties, and the effort and expense of their resolution are minimized or eliminated altogether in the present invention.
10. Generally, the greater the density of the surface barrier coating, and the greater its proportion in the composite, the greater the reduction in the dusting problem. Since the major proportion of the product on a weight basis is often the surface barrier coating, addition of a high density surface barrier coating to the system can effectively eliminate any dusting problems.
11. By virtue of the increased density of the composite, the demands on the processing equipment and system in recovering the expanded and dried microspheres is greatly facilitated, and product losses are substantially reduced.
12. The surface barrier coating is used in the present invention in an amount sufficient to permit the expansion of the microspheres without sticking to the equipment employed or forming agglomerations of microspheres. While this amount will vary depending on the particular equipment employed and with the particular processing conditions, the surface barrier coating will most often be in the range of about 15 to 99, preferably 20 to 97 weight percent of the mixture of barrier coating material and microspheres, on a dry weight basis. As a general rule, in most circumstances the amount employed should be the least amount that will reliably and consistently achieve the defined function of the barrier coating material. It is generally preferred that the barrier coating material be employed in amounts less than 90 and preferably less than 80 weight percent of the blend. This normally results in a dry expanded product which is more than 90 volume percent microspheres.
13. Since the predominant concerns in most uses of microspheres is with the volumetric proportions, even quite considerable proportions by weight of the surface barrier coating can be included without detriment in many end uses. When substantial amounts of the surface barrier coating are introduced as a component of the microsphere formulation, appropriate allowances for this component should be made in the compounding of materials.
14. An excess of the minimum amount of surface barrier coating required to prevent agglomeration may be employed when desired, but it is generally desirable to avoid proportions substantially greater than the amount which will adhere to the surface of the microspheres.

For Liquid Barrier Coatings:
1. The barrier coating liquid material should be a non-solvent for the thermoplastic polymer of the microspheres, and preferably should not swell the polymer of the microspheres.
2. The liquid should freely wet the surface of the microspheres.
3. The liquid should not polymerize, oxidize, degrade or otherwise react under the conditions of mixing, drying, handling, packaging or storage employed. It may, however, be a material selected to chemically react in or physically alter subsequent formulations into which the liquid-bead composite is compounded.
4. The liquid must have a melting point below the temperature of the drying, or drying and expanding operation.
5. If the surface barrier liquid has a melting point above ambient, it is preferred to cool the coated and dried microspheres below that temperature with mixing at a shear which produces a granular or flocculent product.
6. In addition, the liquid should have a boiling point above, and preferably substantially above, the temperature of the drying process and the subsequent or concurrent expansion process.

When a polymerizable or cross-linkable liquid is employed, a variant of the present invention becomes available, that of polymerizing or cross-linking to provide discrete microspheres coated with another polymer. The polymerization or cross-linking reactions may be conducted at conditions which result in expansion of the microspheres or, if desired, at low temperatures where the microspheres remain unexpanded. Strong exotherms should be avoided or controlled to avoid temperatures which are disruptive of the microspheres. Through such options, microsphere products which offer exceptional solvent and temperature resistance, and the like, may be produced. When such techniques are employed, it will ordinarily be preferred to include a solid particulate into the liquid to assure that the microspheres are not bonded together by the reaction and remain in discrete form.

It is a characteristic of the present invention that the handling ease of a solid material is combined with the compounding and mixing ease of a liquid. As a result, processing is greatly facilitated, as the microsphere component will be dispersed into the formulations with the ease of mixing a liquid.

When such polymerizations or cross-linking reactions re employed, they may be thermally activated or catalyzed, addition or condensation polymerizations or cross-linking reactions may be employed, and the reaction may be conducted in an air, inert gas atmosphere, in the presence of a solvent or dispersing medium, or in an interfacial reaction. Interfacial condensation reactions are of particular interest, whether liquid-liquid or vapor-liquid since these types of reactions offer great flexibility in the selection of reactants while still permitting the protection of the microspheres from the effects of constituents which may disrupt the microspheres.

The surface barrier solid, liquid or mixture of such a liquid with a solid is used in the present invention in an amount sufficient to permit the expansion of the microspheres without sticking to the equipment employed or forming agglomerations of microspheres. While this amount will vary depending on the particular equipment employed, and with the particular processing conditions, the surface barrier solid, liquid or mixture of such a liquid with a solid will most often be in the range of about 5 to 97 weight percent of the mixture of barrier coating material and microspheres, on a dry weight basis. As a general rule, in most circumstances the amount employed should be the least amount that will reliably and consistently achieve the defined function of the barrier coating material. It is generally preferred that the barrier coating material be employed in amounts less than 90 and preferably less than 80 weight percent of the blend. This normally results in an expanded product which is more than 90 volume percent microspheres. Because of the considerable surface area of the microspheres, less than about 5 weight percent of the surface barrier liquid may result in incomplete coverage which may lead to subsequent difficulties. In general, it is preferred to employ at least about 10 weight percent of the surface barrier liquid.

Since the predominant concerns in most uses of microspheres is with the volumetric proportions, even quite considerable proportions by weight of the surface barrier solid, liquid or mixture of such a liquid with a solid can be included without detriment in many end uses. When substantial amounts of the surface barrier solid, liquid or mixture of such a liquid with a solid are introduced as a component of the microsphere formulation, appropriate allowances for this component should be made in the compounding of materials.

An excess of the minimum amount of surface barrier solid, liquid or mixture of such a liquid with a solid required to prevent agglomeration may be employed when desired, but it is generally desirable to avoid proportions substantially greater than the amount which will reliably and completely wet the surface of the microspheres.

While the microspheres are produced in an aqueous suspension, it is common to break and de-water the suspension, and to supply the microspheres in the form of a "wet-cake" of about sixty percent solids. This avoids shipping larger than necessary quantities of the aqueous system.

The solids content of the wet-cake is substantially all unexpanded microspheres, but also includes the suspension components, including the wetting agents, so that the remaining water in the wet-cake is extremely difficult to remove. It is, in fact, the wetting agents which make the drying of microspheres a non-trivial exercise. The typical wetting agent is based on the use of a substantial amount of fully hydrated silica (silicic acid), which is present it e wet-cake to be dried. As the material dries, it becomes highly adhesive and can form agglomerates of the microspheres. The usual drying operations in the present invention, much like those of the prior art, are required to assure that such conditions do not arise and that a cementious mass of agglomerated microspheres does not form.

Drying may proceed as done in U.S. Pat. Nos. 4,722,943; 4,829,094; 5,180,752; 5,342,689; or 5,580,656, although the invention is not limited to those processes, since the drying step is not critical to achieving the lower density microspheres.

In liquid-solid systems, it is well known to employ Reynolds numbers to evaluate grinding and mixing conditions. Reynolds numbers correlate well with shear forces in such systems within the ranges employed in the present invention, where the increase in Reynolds number is directly proportional to shear. Where the laminar flow conditions are desirable for optimum pigment grinding into a paint vehicle, for example, it is recommended that the Reynolds number of the mixing not exceed 2,000.

In the context of the present invention, involving the mechanical fluidizing of solids in a gas phase (i.e., air), such parameters are less well developed, but we have observed that operations under similar criteria, i.e., Reynolds number is calculated of less than 2,000, correlate well with the objectives. Specific equipment is discussed below.

Reynolds numbers are a dimensionless value given by the following equation:

$$Re = \frac{pvX}{\eta}$$

Where p=density $(g/cm^3)'$ v=velocity (cm/sec); X=linear dimension (cm); and $\eta$=viscosity (poise).

In the preferred mixing equipment based on a rotating disk mill, the linear dimension X is the shortest distance from the mixing chamber wall to the disk blade, in a direction normal to the plane of the disk.

Broadly speaking, the present invention may be practiced over a wide range of Reynolds numbers, from as low as about 1,000, up to as high as 8,000 or even about 10,000. As those of ordinary skill in the art will recognize, it will generally be desirable to operate at Re of from about 1,000 to about 3,000, and preferably about 1,500 to about 2,250. It is most preferred, when such conditions can be achieved in the equipment employed, to operate at or just below a value of Re=2,000, say from about 1,800 to 2,000.

At calculated Reynolds numbers materially above or below the preferred values, the present invention remains effective, but less efficient, requiring longer processing times and/or tolerance of somewhat higher proportions of agglomerates in the product. The outer limits are defined by shear forces so low that agglomerates are not reduced during processing or so high that the bead structure is disrupted by the impact t of the blade tips.

Because of the turbulence effected by the plow mixer in the mechanically fluidized mixing operation, true laminar flow is often not achieved in the present operation. We have observed, as a consequence, that the range of desirable Reynolds numbers to achieve effective results is rather broader than in simpler systems where true laminar flow conditions can be achieved.

The drying operation is conveniently based on the use of conventional contact type, indirect heat exchange mixing driers with high speed, high shear capabilities. A wide diversity of types of equipment are applicable. In general terms, the requirements are for good temperature control, good mixing of powder and granular materials, and high shear, optionally with operation at reduced pressure provided, and the removal and recovery, preferably with condensation of the evaporated water. Active cooling of the microspheres, either in the mixing drier itself, or in ancillary equipment is also optional.

In the present invention, the expansion of the microspheres is preferably accomplished by heating in combination with active mixing, optionally at low pressure, The microspheres can be heated in an admixture with the surface barrier solid, liquid or mixture of a liquid and a solid. Contact drying processes employing indirect heat exchange are generally the most effective, but in the context of the present invention, they are adapted to accommodate the particular and unusual conditions of operation. For example, the expansion operation may be conducted in a plow mixer, such as those available from Littleford Bros. Inc. of Florence, Ky. or a horizontal paddle mixer, such as the Solidaire®, which is available from Hosokawa Bepex. These mixers produce the vigorous mixing required to achieve complete dispersion and intermixing of the microspheres and the surface barrier solid, liquid or mixture of liquid and solid, and provides the heat exchange capacity to effectively remove the water from the mix. The mixer may be vented to provide for removal of volatiles under reduced pressure or vacuum if appropriate. This can be contrasted with prior processes where substantial shear was avoided to prevent rupture of the microsphere beads, particularly at the higher temperatures which were employed to soften the surface of the beads to achieve expansion. It is our observation that at the lower very controlled temperatures employed for the operation of the present invention, the beads are not ruptured at quite substantial shear levels. Further, it is our observation that the operation of the plow mixer is generally sufficient to eliminate agglomerates in the final product. The fully expanded product is obtained substantially free of agglomerates, i.e., the agglomerates constitute less than 1%, and often less than 0.1%, of the total product.

The term "active mixing," as employed in the present invention, is ultimately a functional term signifying a level at least sufficient to eliminate aggregates in the dried product, and less than the level at which significant disruption of the bead occurs. Specific values of the minimum and maxima will be dependent on the specific equipment employed and the particular conditions of its usage and operation.

The plow mixer is operated at temperatures at which expansion occurs, affording exceptional control over the process. When mixing and expansion are complete, the surface barrier solid, liquid or mixture of such a liquid with a solid will form a substantially homogeneous blend with the microsphere beads substantially free of agglomeration. The microsphere component can be expanded to a density as low as about 0.005 and up to 0.015 grams per cubic centimeter.

The expansion can be carried out in any convenient equipment in either batch or continuous operations suited to effect heat transfer to the microspheres. Since the adherence of the surface barrier solid, liquid or mixture of such a liquid with a solid is maintained at expansion temperatures, and since the water was previously removed, only the thermal requirements for expansion need to be considered and controlled.

It has been found that the homogeneous blend produced in the mixture can be expanded with low shear mixing to aid in uniform and efficient heat transfer by indirect heat exchange in very simple and inexpensive equipment. High speed, high shear mixing is not required in the expansion operation, so long as the dry beads to be expanded already have reduced agglomerates and have been fully wet and achieved sufficient homogeneity in the blend.

While the expansion can be conducted in the plow mixer, it will generally be desirable to expand continuously if desired, in faster, less expensive equipment. Suitable for such use are the Solidaire® continuous heat transfer units available for Bepex Corporation of Rolling Meadows, Ill.

The expansion equipment must provide the energy for the expansion alone. This is not large, and in most circumstances achieving a bead temperature (depending on the specific polymer) at which expansion occurs, as previously defined, there will be little difficulty in attaining the desired degree of expansion. In most circumstances, full expansion is desired, i.e., microsphere density of less than 0.015 g/cm$^3$, preferably about 0.01 g/cm$^3$, and as low as 0.005 g/cm$^3$ (without the surface barrier solid, liquid or mixture of such a liquid with a solid).

The important temperature limitations are defined by the thermoplastic polymer. It is important not to fully melt the polymer mass, so that the hollow spherical structure is lost through over expansion. On the other hand, if the temperature is not high enough to soften the polymer and to develop an adequate pressure of the blowing agent, expansion may not occur, or may be insufficient. Residence time at the appropriate temperature is also a useful control parameter, since there is a definite duration of the expansion process. Even when adequate temperatures are achieved, if the residence time at temperature is too short, the expansion may be insufficient. If the time is too long, the microspheres themselves may be over-expanded and disrupted, leaving broken spheres and polymer fragments and grit in the product with attendant losses of production. While heat transfer rates are generally dependent on the specific equipment employed, residence times on the order of 0.1 to 3 minutes are often sufficient.

The temperatures for expansion are generally near, but not materially above, the glass transition temperature of amorphous materials and the melting temperature of crystalline polymers. These matters are discussed in more detail in the Morehouse patent.

It is the function of the surface barrier solid, liquid or mixture of such a liquid with a solid to prevent the formation of aggregates of the microspheres to the maximum attainable degree. In most equipment this particular requirement is facilitated by the use of continuous, low shear mixing of the material in the expander. Effective mixing also promotes even and uniform heat transfer to the particulate materials.

The degree of expansion can range from substantially none to the known limits of expansion. This parameter is determined by the temperature, the residence time at temperature, and to a lesser degree by the pressure within the system. In the present invention, the degree of expansion to be effected is to the final microsphere density of from 0.005 to a value below the prior art lower limit of 0.015 g/cm$^3$.

Expansion requires that the blowing agent develop a substantial internal pressure (as compared with the external pressure), and that the polymer become softened enough to flow under the effect of the internal pressure. This generally means that the polymer must be heated to a point near its softening or melting or glass transition temperature, or very slightly above. If the polymer temperature is too high, the microspheres will over-expand, burst, and collapse. The upper limit of temperature of the microsphere mass should be about 200° C. for the copolymer beads. The temperature of the heat transfer means which raises the temperature of the microspheres, may be higher, of course. At high temperatures, the residence time at temperature should be brief.

As the temperature is raised to the point at which the microspheres begin to soften and expand and their surface area becomes tacky, the surface barrier solid adheres and the liquid or mixture of such a liquid with a solid wets the surface and prevents agglomeration, and good mixing operates to maximize the extent of heat transfer to the microspheres at this stage in the process. The extent of the mixing is not narrowly critical so long as the mixing maintains a uniform, substantially homogeneous blend of surface barrier solid, liquid or mixture of such a liquid with a solid and microspheres and relatively even heat transfer is obtained.

It is generally preferred to permit the dried and expanded microspheres to cool before they are collected and packaged or otherwise handled. This minimizes the degree to which handling can disrupt the bead structure while the polymer is in the plastic state. Active cooling may be employed if desired.

The resulting microspheres with their coating of the surface barrier liquid can be conveniently recovered from the expander, collected and handled by entirely conventional procedures and equipment usually employed in such operations for dealing with powdered or granular materials. When unusually high proportions of the surface barrier liquid are employed, handling equipment usual for such liquids may be employed.

The result of the process is the production of a unique form of the microspheres. The microspheres will have an adherent surface coating of the surface barrier solid, liquid or mixture of such a liquid with a solid. The liquid or mixture of such a liquid with a solid will completely coat the surface in a substantially continuous layer. By varying the proportions of the barrier coating material and the microspheres, the thickness of the coating may be controlled.

The microspheres of the present invention will often have a low incidence of deformed, non-spherical shapes when compared to the dried and expanded microspheres from the processes of the prior art. It has been found that the level of disrupted microspheres, where the hollow structure with a continuous form is broken, are not frequent, and are as low or even lower than the norms of the prior art processes.

The microsphere product of the present invention can be expanded to very near the newly attained limit of expandability, i.e., to a density of less than 0.015 g/cm$^3$ and down to as low as 0.005 g/cm$^3$.

When the barrier coating material is taken into account, the composite density will, of course, be somewhat higher. Thus the composite density of the product will be determined by the density of the particular barrier coating material employed, the amount of the barrier coating material included, and the degree of expansion. Those of ordinary skill in the art will be able to readily determine the composite density of the product from the information and guidance provided in the present disclosure.

The expanded beads of the present invention will have less than one percent, and often less than 0.1 percent agglomerates. This signifies that at least about 99 percent of the product, and preferably at least about 99.9 percent, will pass a 100 mesh screen. This compares to the prior art dry expanded beads produced by our prior method or by spray drying where acceptable results have represented product wherein from 3 to 10 percent is retained on an 80 mesh screen, while only about 97 percent, and often as little as 90 percent, will pass a 100 mesh screen. In many circumstances, particularly when the microspheres exceed about 30 weight percent of the blend, even higher levels of agglomerates, well in excess of 10 percent of the product, may be retained on the 80 mesh screen by the prior art procedures. In the present invention, the very low level of agglomerates is attained up to 90 percent by weight (in excess of 99 percent by volume). Such low proportions of the surface barrier solid, liquid or mixture of such a liquid with a solid may be highly desirable in some applications of the product.

Once the microspheres are dried, or dried and expanded, they become reduced in specific gravity. The relatively low density component can be passed through a separatory means where the microspheres are separated from the gas stream. The separatory means can be any convenient mechanism, including a range of separator types, filters, such as bag filters, and the like. Cyclone separators are preferred. The microspheres can then be packaged in convenient form, or can be subject to further processing, as required.

In practice, the best results, and thus the preferred technique at the present, is to employ the mill technique for drying, followed by mixing with barrier coating components and conducting expansion in the Hosokawa Bepex Solidaire® mixer describe above. It has been observed that the mill provides very good drying properties, at very high throughput, while at the present stage of development, at least, the Bepex Solidaire mixer gives closer control of temperature gradients and residence times for expansion.

The following description is general in scope and for the particular guidance of those of ordinary skill in the art. The following specific examples are intended to provide particular demonstrative guidance in the practice of the present invention.

COMPARATIVE EXAMPLE

Acrylonitrile microspheres were coated and expanded in accordance with Example 1 of U.S. Pat. No. 5,180,752 to George E. Melber, et al. The differences in the process are that the starting microspheres are those commercially available from Matsumoto Yushi Seiyaku. The microspheres were dried to less than 0.5% moisture. Further, the processing aid employed was calcium carbonate, which is available as Omyacarb #3 from Omya A. G. The mix was 85% calcium carbonate and 15% microspheres. The blend was expanded in a Bepex Solidaire® horizontal paddle mixer which employs oil heat and was operated at an external temperature or oil temperature of 180° C.±5° C., while the internal temperature, as measured at the exit port of the mixer, of the composite mass was 165° C.±10° C. In Example 1 of U.S. Pat. No. 5,180,752, the temperature reference was the temperature of the dry steam of the heating jacket, but the operating temperatures employed in the present example are believed to be consistent with Example 1 of the Melber patent.

The product was examined and found to have the following characteristics: the extended microspheres had an even, substantially continuous surface coating of calcium carbonate particles adhered over the surface. No agglomerate and no ruptured beads were observed. The beads had an average composite density of 0.13 grams per cubic centimeter and an average base microsphere density of 0.02 grams per cubic centimeter.

EXAMPLE

The same materials were employed as in the Comparative Example in accordance with the teachings of the Melber patent, except that the external temperature was 220° C.±5° C. and the internal temperature of the composite mass was 205° C.±5° C.

Upon examination, it was observed that the expanded microspheres also had an even substantially continuous surface coating of calcium carbonate particles adhered over the surface, and no agglomerates or ruptured beads were observed. The particles had an average composite density of 0.062 grams per cubic centimeter, and an average base microsphere density of 0.01 grams per cubic centimeter.

As can be seen, the process of the present invention produced microspheres having a significantly lower densities while retaining the important particle characteristics and structure. Therefore, the microspheres of the present invention will provide improved cost benefits when employed in applications which employ the prior art microspheres and improved strength-to-weight values in other applications.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

We claim:

1. A dry, free-flowing expanded thermoplastic clad microsphere, wherein said thermoplastic is a polymer material, excluding polyvinylidene chloride homopolymer, polystyrene, or polyvinyl chloride, which functions as a vapor barrier to a blowing agent at the temperatures and pressure differentials of expansion of the microsphere, has Tg values of at least about 50° C., said microsphere has a density of from less than 0.0145 g/cm$^3$ to about 0.005 g/cm$^3$.

2. A composite of dry, free-flowing expanded thermoplastic microspheres which incorporates the expanded thermoplastic microspheres of claim 1, which microspheres have a thermally bonded coating of an adherent surface barrier coating material and which has a density of less than 0.06 g/cm$^3$.

3. A composite of dry, free-flowing expanded thermoplastic microspheres which incorporates the expanded thermoplastic microspheres of claim 1, which microspheres have a thermally bonded coating of an adherent surface barrier coating material and which has a density of 0.06 g/cm$^3$ to 0.005 g/cm$^3$.

4. The microsphere of claim 1 wherein said microsphere has a surface barrier coating, which has a softening or melting point at a temperature above that of said thermoplastic.

5. The microsphere of claim 1 wherein said microsphere has a surface barrier coating material which is selected from the group consisting of talc, calcium carbonate, barium sulfate, alumina, silica, carbon, titanium dioxide, zinc oxide, ceramic beads, quartz beads, glass beads, poly (tetrafluoroethylene) beads, glass fibers, cotton fibers, polyamide fibers, carbon fibers, ceramic fibers, and mixtures thereof.

6. The microsphere of claim 1 having an adherent surface barrier coating, wherein said surface barrier coating is from a liquid which wets the surface of said thermoplastic to form a continuous coating thereon.

7. The microsphere of claim 6 wherein said adherent surface barrier coating selected from the group consisting of plasticizers, monomers, oligomers, prepolymers, polymers, extenders, diluents, non-aqueous solvents, wetting agents, and mixtures thereof.

8. The microsphere of claim 6 wherein said surface barrier coating is added in an amount sufficient so that a composite of microspheres will form a floc of said microspheres.

9. The microsphere of claim 6 wherein said surface barrier coating is a component of a polymerization or cross-linking reaction.

10. The microsphere of claim 6 wherein said surface barrier coating is a plasticizer, and the coated microsphere is incorporated into a plastisol.

11. The microsphere of claim 1 wherein said microsphere has a density of from 0.01 g/cm$^3$ to 0.005 g/cm$^3$.

* * * * *